Aug. 2, 1932.  H. A. POPPENHUSEN  1,869,773
DISPENSING MACHINE
Filed March 5, 1928  7 Sheets-Sheet 1

Fig.1.

Inventor:
Herman A. Poppenhusen,
By Eugene Covann
Atty.

Aug. 2, 1932.  H. A. POPPENHUSEN  1,869,773
DISPENSING MACHINE
Filed March 5, 1928  7 Sheets-Sheet 5

Inventor:
Herman A. Poppenhusen,

Aug. 2, 1932.  H. A. POPPENHUSEN  1,869,773
DISPENSING MACHINE
Filed March 5, 1928   7 Sheets-Sheet 6

Inventor:
Herman A. Poppenhusen,
By Eugene Cowan
Atty.

Patented Aug. 2, 1932

1,869,773

UNITED STATES PATENT OFFICE

HERMAN A. POPPENHUSEN, OF HAMMOND, INDIANA

DISPENSING MACHINE

Application filed March 5, 1928. Serial No. 259,336.

This invention relates to a method of and means for mechanically dispensing ice-cream or other similar semi-solid bulk material.

One object of my invention is to provide means whereby individual pieces are cut directly from the bulk of the material without disturbing or displacing the bulk to bring it into position for the action of the cutting means.

Another object of my invention is to move the cutting means directly into the material so that the pieces may be cut therefrom without being required either to turn the receptacle containing the material or lift the receptacle to reach the cutting means.

A further object of my invention is to progressively feed the cutting means into the material so that the receptacle in which the material is contained may be completely emptied of its contents by repeated operations of the machine.

A further object of my invention is to provide means whereby the operator may set the machine for the cutting and delivery of any particular size of piece as may be desired to meet varying requirements of the trade.

A further object of my invention is to provide means for withdrawing the cutter from the receptacle after each cutting operation so that the individual pieces successively carried by the cutter may be readily discharged therefrom.

A further object of my invention is to normally maintain the cutting means entirely out of the receptacle while the machine is idle, and thus prevent frosting of the cutting means.

A further object of my invention is to provide a novel form of mounting for the machine so that the machine may be readily and easily shifted from over the receptacle to permit replacement of an empty receptacle by a filled one, or for setting the device to operate on an adjacent full receptacle, or for access to the receptacle for manually dispensing the contents thereof in case the machine fails to function for any reason.

A further object of my invention is to provide a machine which is simple in construction and operation and one which completely covers the receptacle to prevent exposure and contamination of the bulk within the same, and thus secure a completely sanitary dispensing machine in which no opportunity is afforded for the operator to come into contact with the bulk of the cream at any time.

The invention consists further in the matters hereinafter described and claimed.

In the accompanying drawings—

Figure 3:
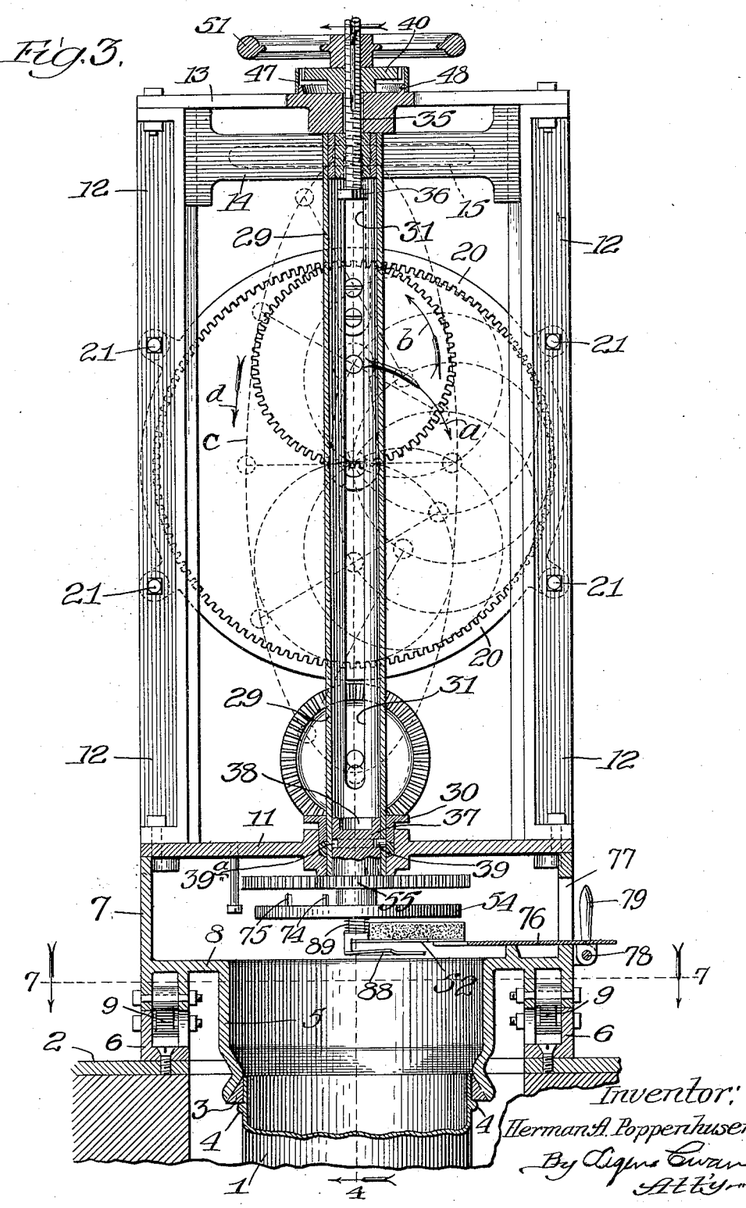
Fig. 3 is a vertical sectional view taken on line 3—3 of Fig. 2.
Figure 4:
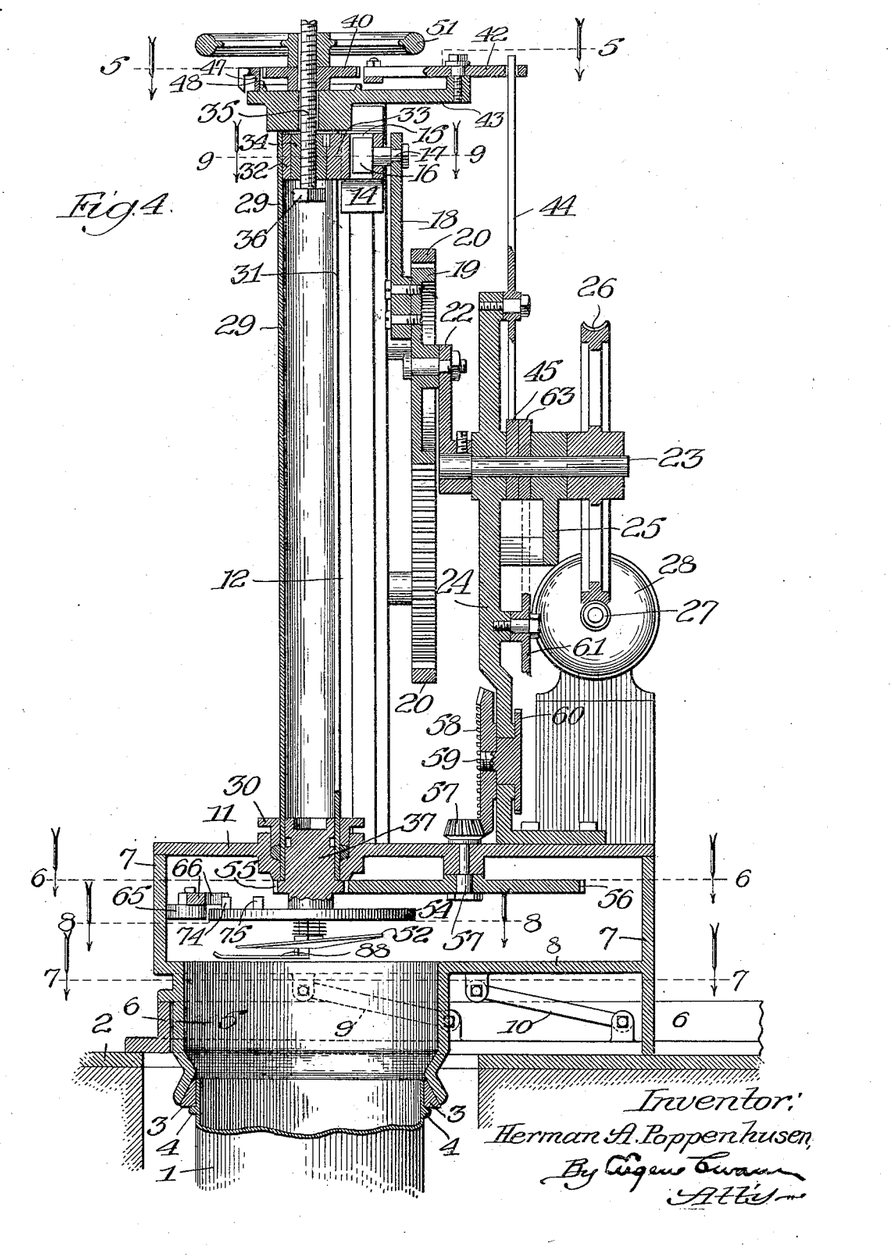
Fig. 4 is a vertical sectional view taken on line 4—4 of Fig. 3.

In Figs. 3 and 4 of the drawings, 1 indicates a conventional ice-cream can or receptacle packed in ice or set in a refrigerating chamber in a cabinet 2 below the top thereof. An adapter ring 3 is placed about the upper end of the can on the outside bead 4 after the cover of the can has been removed. A collar 5, which forms a part of the machine to be presently described, fits about the ring 3 and, by providing engaging inclined surfaces on the collar and the ring, respectively, the machine when set over the can is centered with respect thereto.

Figure 1:
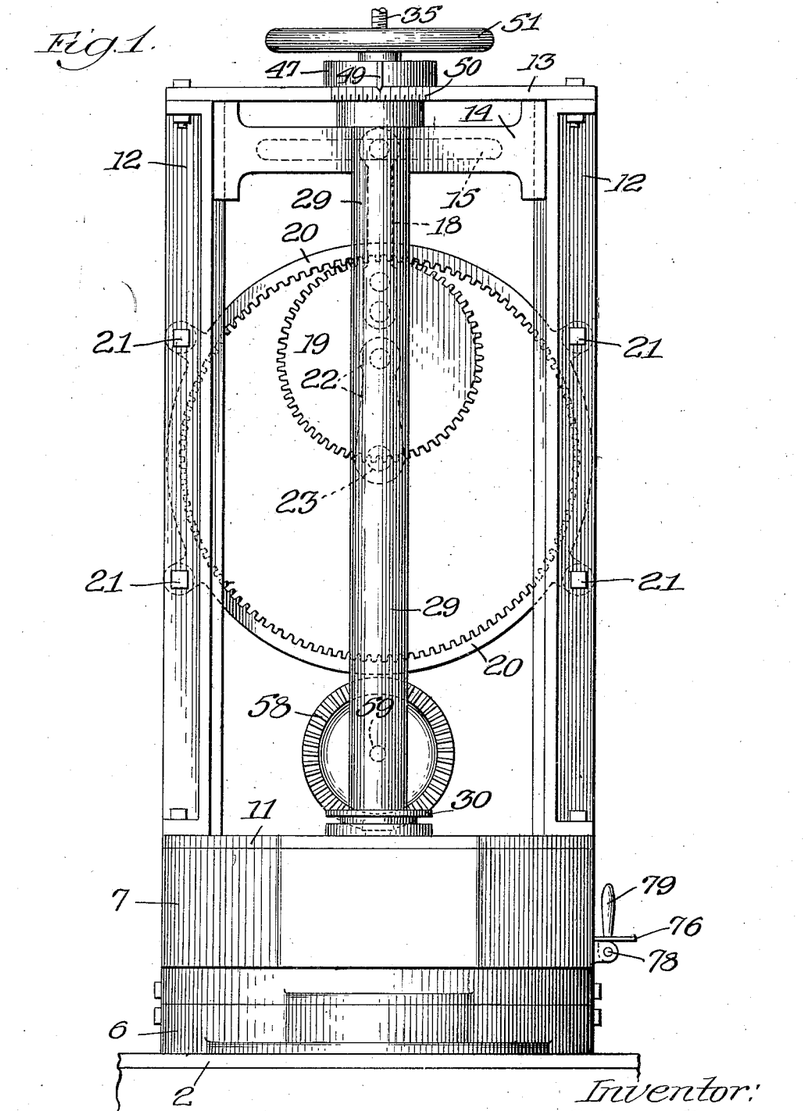
Fig. 1 is a front view of the machine of my invention with parts omitted for the sake of illustration.
Figure 2:
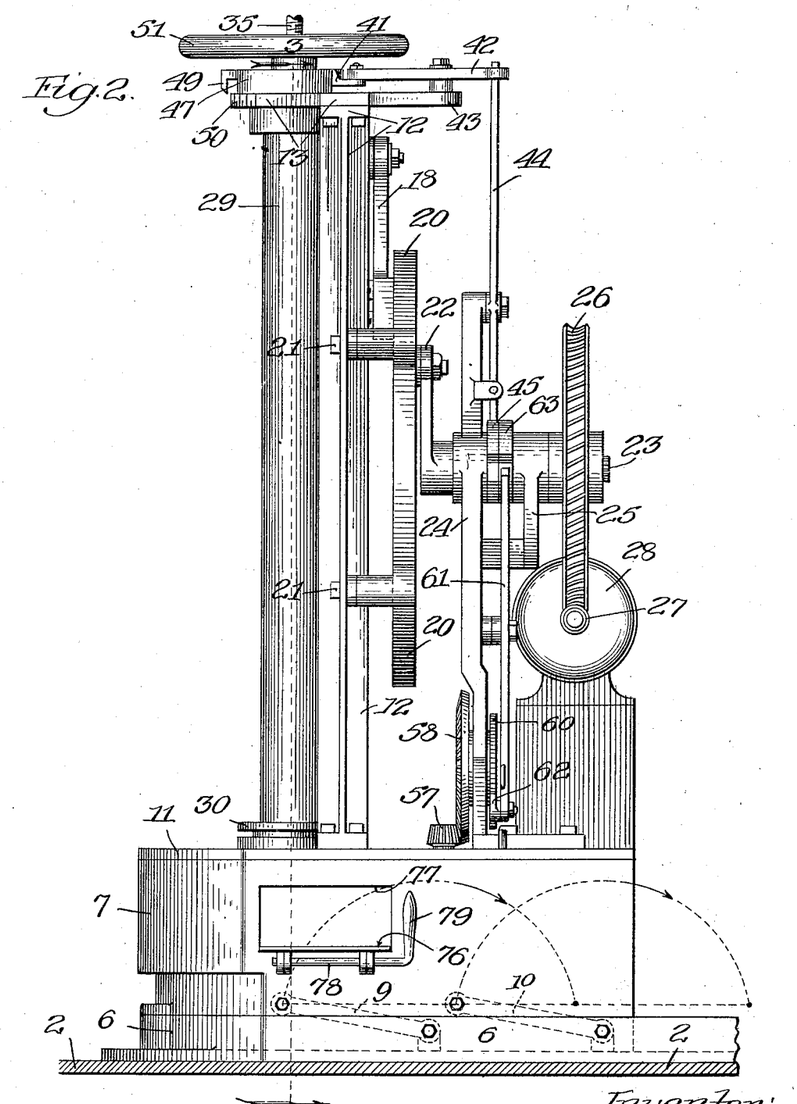
Fig. 2 is a side view of the machine.

The base of the machine has a supporting frame 6 which is secured to the top 2 of the cabinet about the opening therein for the can. The base has an upper movable part 7 in the form of a housing which rests on the upper edges of the frame 6 when the machine is over the can. The collar 5 is within this housing and extends downward from a plate 8 to meet the can and form an upward continuation thereof. With the base made in two parts 6, 7, the upper part 7 may be moved toward and from the lower part 6 in shifting the machine into or out of operative position over the can. One form of means for this purpose comprises parallel links 9 and 10 arranged in pairs on opposite sides of the base and pivoted to the upper and lower parts 6, 7, respectively, as shown in Figs. 2, 3, and 4. When separating these parts, the collar 5 is first disengaged from the can 1 by the upward swing of the links and thereafter carried clear of the opening in the cabinet 2 to give full access to the can in case the machine fails to function for any reason or to permit replacement of an empty can by a filled one.

Figure 9:
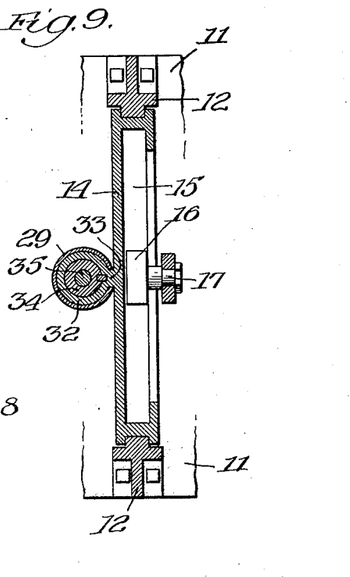
Fig. 9 is a similar section taken on line 9—9 of Fig. 4.

The upper part 7 extends above the plate 8 and supports a horizontal top plate 11 which forms a cover for the base. Rising upward from the plate 11 are a pair of standards 12, 12 of suitable height and connected at their upper ends by a cross member 13. A cross-head 14 is slidably engaged with the standards 12 and has an elongated T-shaped slot 15 therein to accommodate a similarly shaped block 16, as shown in Figs. 4 and 9. Said block has a pin 17 which extends outward from said slot and is connected to the upper end of an arm 18 which is rigidly attached to the face of a planet pinion 19. Said pinion 19 is in mesh with the teeth of an internal ring 20 which is fixed by cap screws 21 to the standards 12.

The pinion 19 is revolubly mounted on the outer end of a crank arm 22 which is keyed or otherwise fastened to the main operating shaft 23 of the machine. The arm 22 holds the pinion 19 in alignment with the ring gear 20. An upright standard 24 rises upward from the plate 11 to the rear of the ring gear 20 and provides a support for the shaft 23. Two bearings are provided for the shaft, one in the standard where the shaft extends through it and the other in a bracket 25. The shaft 23 may be operated manually or by power. In the former case, a crank handle would be provided at the outer end of the shaft. In the drawings, however, I have shown the shaft operated by power, and to this end I affix to the outer end of the shaft a worm gear 26 which meshes with a worm 27 on the armature shaft of an electric motor 28 which is mounted on the base of the machine.

A tube 29 is slidably mounted in the plate 11 and extends upward therefrom on the front side of the cross-head 14, as shown in Fig. 3. The lower end of the tube extends through the plate 11 through a gland nut 30 which frictionally engages the tube to keep it from sliding under its own weight. The tube 29 has a length to extend the full height of the machine and is provided in its side adjacent the cross-head 14 with a vertically elongated slot 31 closed at each end. This slot has a length equal to the vertical movement of the cross-head during the operation of the machine.

Slidably fitting within the tube 29 is a collar 32 which is integrally connected by a web 33 with the cross-head and which web extends through the slot 31. Keyed to the collar 32 is an internally screw-threaded nut 34 through which extends a screw-threaded rod 35. The rod 35 works in the tube 29 and is provided at its lower end with a head 36 which engages a block 37 in the lower end of the tube in the downward movement of the rod with the cross-head 14. The block 37 is provided in its upper side with a socket 38 to receive the head 36 on the rod, these parts being made square or of similar shape so that when engaged the block will be turned in the turning of the rod. The block 37 is rotatably mounted in the tube 29 by lugs 39 carried by the tube and extending into an annular groove 39ª in the block, as shown in Fig. 3.

Figures 12, 13, 14, 15:
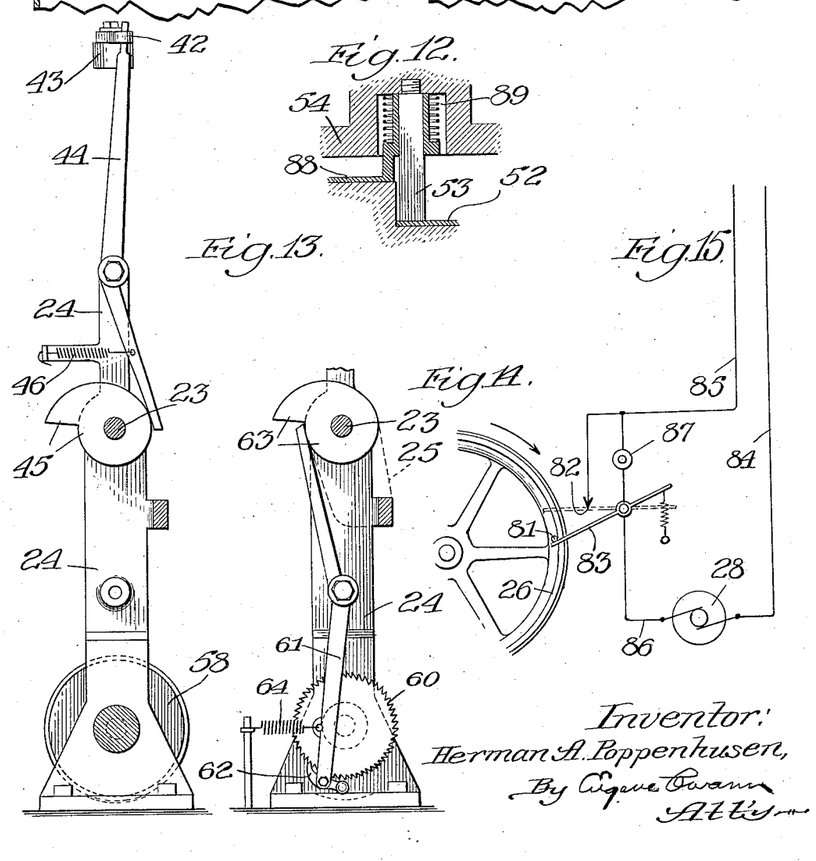
Fig. 12 is an enlarged vertical sectional view through said assembly.
Figs. 13 and 14 illustrate the cam assemblies to be hereinafter described.
Fig. 15 is a diagram of the electrical control for the machine.

The rod 35 extends through and is splined in a ratchet wheel 40 which is turnably mounted on the cross-member 13, as shown in Fig. 3. The wheel 40 is turned by a spring set pawl 41 which is pivotally carried on the front of a horizontally swinging lever 42, said lever being fulcrumed between its ends on a bracket 43, which extends rearward from the cross-member 13, as shown in Fig. 4. The lever 42 is actuated at a fixed stroke through the medium of a vertically arranged lever 44 which is fulcrumed between its ends at the upper end of the standard 24. A cam 45 fixed on the shaft 23 operates against the lower end of the lever 44 in the rotation of the shaft. A coiled spring 46 of sufficient strength holds the lower end of the lever 44 against the cam, and the latter is so shaped, as shown in Fig. 13, to expand the spring to its maximum extent until the high point of the cam passes the lower end of the lever, whereupon the spring will quickly return the lower end of the lever to the low point of the cam and thus impart a quick throw to the lever 44 and rotate the ratchet wheel 40 to a fixed extent as determined by the throw of the cam. In this action the cam 45 acts to set the spring 46, the latter serving to do the actual work in turning the ratchet wheel.

Figure 5:
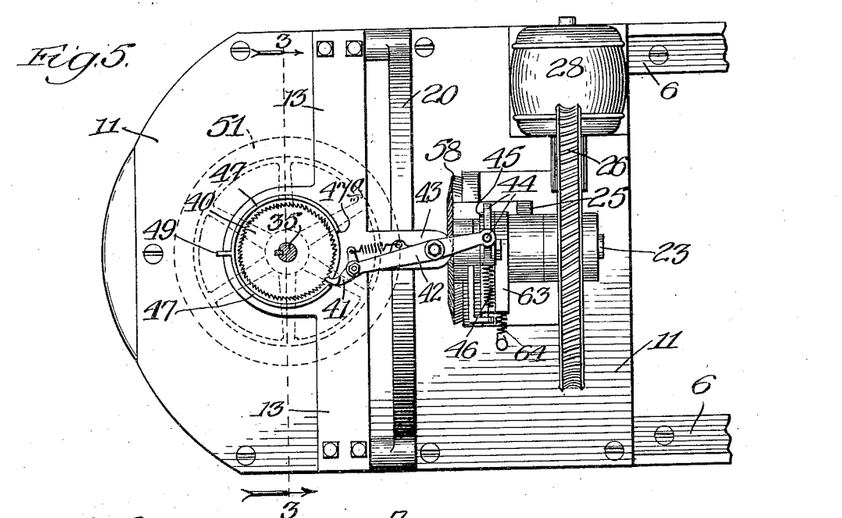
Fig. 5 is a horizontal view taken on line 5—5 of Fig. 4.

To vary the amount of turning movement given to the ratchet wheel 40 by the pawl 41, I provide means for regulating the number of teeth that the pawl may engage to turn the wheel. This means, as shown in Fig. 5, takes the form of a shield 47, which is turnably mounted on the cross-member 13 about an annular rib 48. The shield has a friction grip on the rib so that the shield will be held in place but may be adjusted circumferentially about the axis of the wheel. The portion of the shield 47 at the pawl 41 is cut away, as at 47$^a$ (Fig. 5), to expose the maximum number of teeth on the ratchet wheel within the range of movement of the pawl. The adjustment of the shield is accomplished by the operator shifting a pointer 49 on the shield over a suitably graduated index or scale 50 marked on the front side of the cross-member 13. This portion of the cross-member may be arcuate in shape to conform to the arcuate movement of the pointer, and the graduations are such as to indicate the sizes of the individual pieces of the material which will be cut from the bulk in the can or receptacle 1.

The sizes of these pieces are determined by the number of teeth of the wheel 40 exposed at the opening 47$^a$ in the shield. This opening has a length circumferentially equal to the maximum stroke of the lever 42 so that when the pointer 49 is set to cut the largest size piece from the bulk, the full number of teeth of the ratchet corresponding to its fixed stroke are exposed, so that the pawl may move the wheel through its maximum arc of rotation. On the other hand, when the shield 47 is adjusted for the cutting of a smaller piece, the shield picks up the pawl on the last portion of its return stroke to reduce the number of teeth that the wheel will be moved on the forward stroke of the pawl, the shield acting to maintain the pawl out of contact with the reduced number of teeth until the pawl drops into the opening 47$^a$ off of the shield.

A hand wheel 51 is splined to the screw-threaded rod 35 above the ratchet wheel 40 so that the operator, after a can has been emptied, may return the rod to the position for starting on a full can. At this time the shield 47 is turned so as to disengage the pawl from the ratchet wheel while hand wheel 51 is reversely turning rod 35.

The means whereby individual pieces may be successively cut and removed from the bulk in the can or receptacle 1, comprises a relatively flat cutter blade 52 substantially horizontally disposed and projecting radially from a spindle 53. This is fixed to the block 37 and extends downward therefrom below the lower end of the tube 29 so that the blade 52 will be rotated in the turning of the block by the screw 35. The spindle 53 is vertically aligned with the axis of the can or receptacle 1, and the cutter blade 52 has the same radius as the can and is shaped in the form of a segment thereof, as clearly shown in Fig. 8.

The blade 52 is set at an inclination conforming to the pitch of the threads on the screw 35, so that the blade on being turned by the screw will follow a spiral path in the can and thereby offer the least resistance to the cutting of the bulk in the can. With the blade so inclined it will advance with a true cutting action into the bulk and avoid displacement of the bulk except along the surface of the blade, thereby permitting a relatively wide blade to be used and form a support for either large or small pieces. The blade extending from the center to the inner circumference of the can will in its progressive spiral travel reach all of the bulk in the can and ultimately empty the can.

The blade 52 is brought downward to cutting position in the downward movement of the rod 35 after its head has engaged in the socket 38 in the block 37. After the blade has reached this position, then the rod 35 is turned by the ratchet wheel 40 through the angle determined by the setting of the pointer 49 so as to cut the desired size of piece or slice from the bulk in the can. This cutting action takes place just prior to the extreme end of the downward stroke of the cross-head 14, the position of the rod in the cross-head determining the amount of downward movement of the block 37 and the blade 52. The extent of this downward movement depends on the distance that the head end of the rod 35 extends downward from the cross-head. This distance is increased at every stroke of the machine by the turning of the screw rod in the nut 34 by the ratchet wheel 40. This causes the cutter 52 to successively work in a spiral path and ultimately reach the bottom of the can.

The cutter 52 after completion of its cutting action is always returned to the same uppermost level in the space above the adapter collar 5 so as to be completely out of the can. This is brought about in the upward movement of the cross-head as the web 33 moves upward against the upper end of the slot 31. While the cutter blade 52 is returned to the same upper level each time, the angular position of the blade changes progressively with each succeeding stroke but the blade is always positioned to be moved down into engagement with the bulk in the can exactly where the previously cut piece terminated. At the completion of the cutting stroke, the rod 35 is moved upward by the cross-head and disengaged from the block 37, whereupon the web 33 moves into engagement with the upper end of the slot 31, lifting tube 29 and raising the cutter blade 52 with a cut piece out of the can to the uppermost level referred to.

To automatically discharge the piece carried by the blade from the machine at any angular position of the blade after it reaches the uppermost level, I provide the following construction. A horizontally disposed circular plate 54 is secured to the spindle 53 at a suitable distance above the cutter blade 52. A gear pinion 55 is secured to the spindle at the lower end of the block 37 and is brought into mesh with a gear wheel 56 when the cutter blade reaches its uppermost level. The gear wheel 56 is fixed to the lower end of a vertical shaft 57 which is journaled in and extends upward above the top plate 11. A beveled pinion 57 is keyed to the upper end of this shaft, and said pinion meshes with a vertically disposed beveled gear 58 fixed to a stub shaft 59 journaled in the upright standard 24, as shown in Fig. 4. This shaft extends through the standard, and a ratchet wheel 60 is fixed thereto.

For turning the ratchet wheel 60, I provide a vertically disposed lever 61 fulcrumed between its ends on the rear side of the standard 24. A gravity acting pawl 62 is pivotally carried at the lower end of the lever 61 and arranged to engage the teeth of the ratchet wheel 60. The upper end of the lever 61 bears against a cam 63 which is fixed to and rotated by the main shaft 23. A coiled spring 64 is connected to the lever 61 adjacent its lower end. In the rotation of the cam 63, the spring is expanded as the pawl ratchets rearward over the teeth of the ratchet wheel 60 until the high point of the cam passes the upper end of the lever 61, whereupon the spring acts at the forward throw of the lever and in turn rotates the ratchet wheel 60 a fixed number of teeth. The ratios between the pinion 55 and the angular throw of the ratchet wheel 60 by the pawl is fixed so as to produce exactly one revolution of the pinion 55, when the ratchet wheel 60 is moved through the fixed stroke of the lever 61 as determined by the depth of the cam 63. This imparts a complete revolution to the plate 54 and the cutter blade 52, thereby returning the cutter blade back to its previous angular position.

Figure 6:
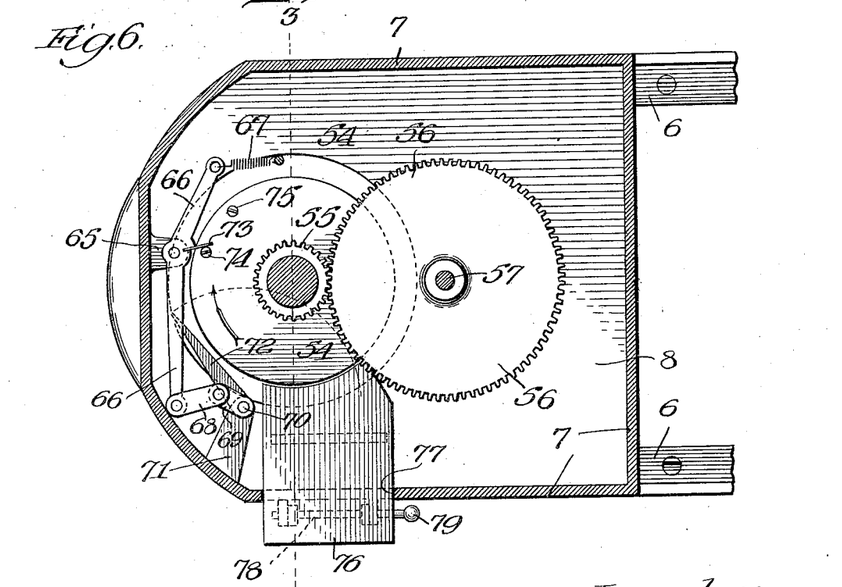
Fig. 6 is a horizontal sectional view taken on line 6—6 of Fig. 4, the discharger being shown in its retracted position.
Figure 7:
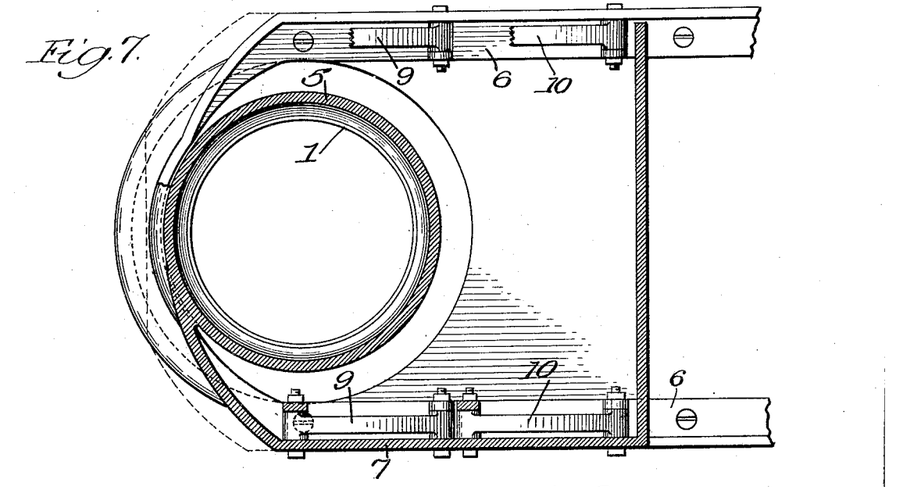
Fig. 7 is a similar sectional view taken on line 7—7 of Fig. 4.
Figure 8:
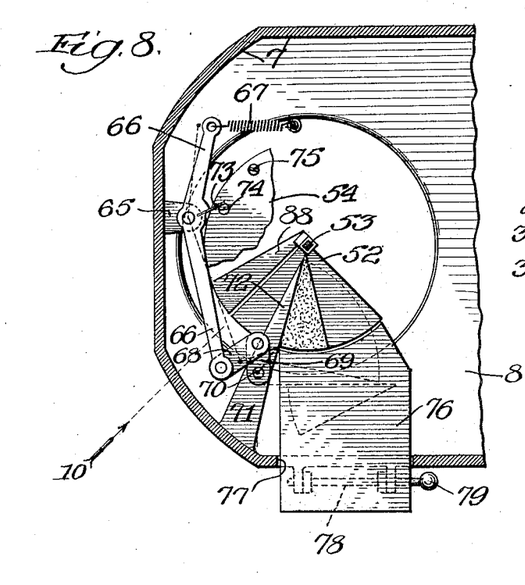
Fig. 8 is a horizontal sectional view taken on line 8—8 of Fig. 4 and illustrating the action of the discharger.

The upper part 7 of the base has an inwardly extending lug 65 in the space between the plates 8 and 11. A horizontally disposed lever 66 is fulcrumed between its ends on the upper side of the lug 65, as shown in Figs. 6 and 8. A coiled spring 67 is connected to one end of the lever 66 and normally maintains it in its inactive position, as shown in Fig. 6. A link 68 is pivoted to the opposite end of the lever 66, and a crank 69 is pivoted to the free end of this link. The other end of the crank 69 is keyed to a rock shaft 70 which is journaled in a stationary lug 71 which also extends inward from the base part 7. The shaft 70 extends below the lug 71, and a sweep arm 72 is keyed to the lower end of the shaft 70 so that the sweep arm is in a position to sweep over the upper side of the cutter blade 52 and discharge the cut piece therefrom in the actuation of the lever 66.

A lug 73 on the lever 66 adjacent its fulcrum extends inward so as to overlie the peripheral portion of the disc 54 when the latter is at its uppermost level. I provide means on this disc 54 to engage the outer end of the lug 73 in the rotation of the disc so as to swing the lever 66 against the tension of the spring 67 through an arc sufficient to effect the sweeping action of the sweep arm 72. This means may take the form of a pair of upstanding pins 74, 75 at the outer periphery of the disc, as shown in Fig. 6. These pins are circumferentially spaced apart a distance sufficient so that one pin will always carry lever 66 through its full sweeping stroke when plate 54 makes a complete revolution. As plate 54 always turns with the cutter blade 52 and progresses angularly therewith, the pins 74, 75 may be ahead or behind or on opposite sides of lug 73 depending on the angular position of the plate. By spacing these pins apart and at a suitable angle with respect to the cutting edge of the blade, one of these pins will always actuate the sweep arm 72 through its full stroke.

The lower edge of the lug 73 and the upper ends of the pins 74, 75 are beveled so that the pins may pass on either side of the lug 73 when they are brought upward with the plate 54 in the event that the lug 73 is in the path of the upward movement of either pin.

The cutter blade 52 is made wide enough circumferentially so that the arcuate movement of the sweep arm 72 is always within the width of the blade. Owing to the different angular positions that the cutter blade 52 may assume due to the adjustments afforded by the stroke of the rod 35, the teeth of the pinion 55 are exact multiples of the number of teeth on the ratchet wheel 40 so that the pinion 55 will always be returned to a position which will mesh its teeth with those of the gear 56. After either pin 74 or 75 acts on the lever 66, spring 67 returns the sweep arm 72 back to its starting position which is outside of the periphery of the plate 54 and therefore will not interfere with the up and down movement given to the plate in the action of the machine.

To receive the piece swept from the cutter blade 52 by the sweep arm 72, I provide a tray 76 which extends outward through a discharge opening 77 in the side wall of the base part 7, as shown in Fig. 3. This tray is fixed to a rock shaft 78 journaled on the outside of the base part 7, and said shaft has a handle 79 for tilting the tray and causing the piece thereon to be discharged from the machine through the opening 77. A stop 80 holds the tray in horizontal position for receiving a piece from the cutter blade.

With the parts in the positions shown in

Figs. 1 to 4, the cross-head 14 is at the limit of its upward stroke and there comes to rest after each complete cycle of the machine. On turning on the current to the motor 28 through the medium of a suitable switch or push button, as the case may be, the shaft 23 is rotated and the crank arm 22 carries the planet pinion 19 around the inner surface of the ring gear 20 in the direction indicated by the arrow $a$ in Fig. 3. The pinion 19, being free to revolve, is turned through the teeth of the ring gear in the reverse direction, as indicated by the arrow $b$. Turning the pinion in this direction swings its arm 18 downward and causes the pin 17 at the outer end of said arm to travel in an elliptical path $c$ and in the direction of the arrow $d$. Such travel of pin 17 carries the cross-head 14 up and down between the standards 12 in one revolution of the shaft 23.

The slot 31 in the tube 29 permits the cross-head 14 to move downward along the tube without moving the latter until after the head 36 on the rod 35 has entered the socket 38 in the block 37, whereupon the continued downward movement of the cross-head to the full limit of its downward stroke effects a corresponding downward movement of the tube and carries the cutter blade 52 into contact with the bulk in the can 1. Before the extreme limit of this downward stroke is actually reached, the cam 45 has been turned by the shaft 23 to permit movement of the lever 44 by the spring 46. This turns the ratchet wheel 40 so as to rotate the cutter blade 52 and slice a piece from the bulk in the can.

As the planet pinion 19 travels up the other side of the ring gear 20 on its return movement, the cross-head 14 is raised upward and the lower end 36 of the rod 35 is raised from the block 37. The blade 52 has completed its cutting stroke and remains in its lowered position until the web 33 engages the upper end of the slot 31, whereupon the tube 29 is lifted carrying therewith the cutter blade 52 with a cut piece thereon out of the can. Just prior to the completion of this upward stroke, the pinion 55 is brought into mesh with the gear 56, whereupon the cam 63 permits the spring 64 to actuate the lever 61 and turn the plate 54 through ratchet wheel 60 to actuate the sweep 72 and transfer the piece carried by the blade onto the tray 76 for discharge from the machine. This entire operation of cutting and discharging a piece from the machine is performed in one revolution of the shaft 23.

For automatically starting and stopping the motor 28 at the end of each revolution of shaft 23, I provide a laterally projecting pin 81 on the rear face of the worm gear 26 and a make and break switch comprising a fixed terminal or contact 82 and a spring closed movable contact 83 suitably mounted on a fixed part of the machine. Two power leads 84, 85 are employed, the former leading to the motor 28, and the latter leading to the fixed contact 82. A lead 86 connects the other terminal of the motor with the movable contact 83. With the movable contact 83 in the path of movement of the pin 81, the latter when it separates the contacts stops the motor and holds the circuit open. The pin 81 is so set on the worm gear 26 that this happens at the end of the upward stroke of the cross-head 14. Extending across the leads 85, 86 is a push button switch 87 by means of which the motor circuit may be shunted around the open make and break to operate the motor until the make and break has closed, whereupon the push button may be released and the motor continues to operate until again stopped by the automatic opening of the make and break.

Figure 10:
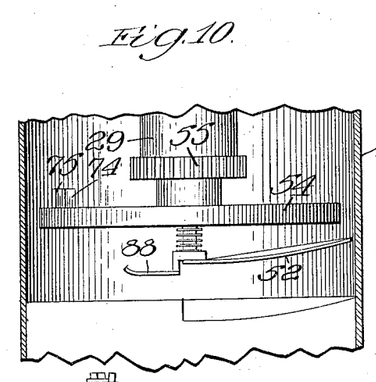
Figs. 10 and 11 are side views of the cutter and stripper assembly shown in its non-cutting and cutting positions, respectively.
Figure 11:
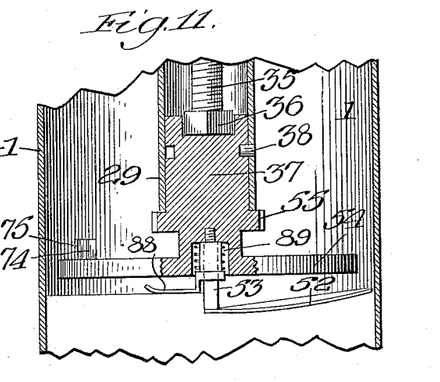

To avoid disturbance of the uncut bulk in the can as the cutter 52 is raised, I provide a stripper plate 88 turning with the spindle 53 but vertically slidable thereon, as shown in Figs. 10 to 12. A coiled spring 89 about the spindle normally holds the plate 88 below the cutter 52 so as to avoid interference with the action of the sweep arm 72 when discharging a piece from the blade. The plate 88 is in an angular position slightly ahead of the cutting edge of the blade 52 to permit unobstructed movement up and down of plate 88 with respect to the cutter.

In the down stroke of the cutter 52 and its spindle 53, the plate 88 first comes in contact with the bulk in the can, compressing its spring 89 as the cutter moves below the plate to the level of the previously cut piece. When the cutting action takes place, the presser plate 88 and blade 52 turn in unison, the plate sliding on the bulk throughout the cutting movement. When the lifting action of the blade 52 takes place, the spring 89 holds the plate 88 firmly against the uncut bulk just in advance of the cutter so that the cutter may be lifted with its piece without disturbing the uncut bulk. Continued upward movement of the cutter 52 permits the spring 89 to expand and return the plate 88 to its normal lowest position.

Some of the advantages of my improved mechanism are as follows: The machine is entirely automatic in its action and cuts and discharges pieces of predetermined size from the undisturbed bulk of the cream in the can. By its use the cream in the can is protected from repeated exposure to contamination so evident with manual serving. The machine is simple in construction and operation, compact in form, is readily usable with the conventional ice-cream cans.

With the cutter 52 being moved into and out of the can and being turned to effect the cutting of the cream, the entire cutting and dispensing action is contained within the machine, thereby making it unnecessary to either rotate the can or lift it to reach the cutter or dispensing means. The important advantage in this is that the can remains undisturbed in its packing of ice or refrigerating element, and no special adaptations are required to pivot or to raise and lower the can. Consequently, no changes are necessary in connection with the cabinet, and the machine may therefore be readily installed in place over cans and cabinets in common use. With the machine entirely outside of the can, as shown and described, the entire machine may be readily applied to and removed from the can and while removed affords the usual space for taking out empty cans and replacing them by filled ones, or resorting to hand dipping in case the machine should fail to function for any reason.

Another important feature of the machine is that the size of the pieces can be determined at the will of the operator through the setting of the index 49 before the machine is set in motion, and thus the machine can be made to cut and discharge pieces of sizes required to meet the demands of the trade.

The mechanical movement provided for reciprocating the cross-head 14 allows for up and down movements of the cross-head to the extent required, yet in a very narrow space as the major axis of the elliptical movement is along the line of reciprocation of the cross-head and the minor axis transverse thereto. This enables the machine to be constructed within the confined spaces usually found in dispensaries of cream.

The details of construction and arrangement of parts may be variously changed and modified without departing from the spirit and scope of my invention. Moreover, the invention is not limited to a machine for dispensing ice-cream, as it is applicable to any semi-solid bulk material of any character which may be dispensed in successive pieces. If the bulk material being operated on is of a nature not requiring the stripper plate 88, it may be dispensed with without affecting the operation of the machine.

I claim as my invention:

1. A machine for dispensing semi-solid bulk material from a receptacle, comprising automatic means for cutting successive pieces directly from the material within the receptacle, and means whereby the machine may be set to cut pieces of different sizes from the bulk material within the receptacle, said means including a pointer which may be set in advance of the operation of the cutting means to indicate the size of the piece to be cut.

2. A machine for dispensing semi-solid material from a receptacle, comprising means including a substantially flat rotary blade for cutting successive pieces directly from the material within the receptacle, and means for automatically discharging the cut pieces from the machine directly from the upper side of the blade.

3. A machine for dispensing semi-solid material, comprising a cutter blade, means for moving the blade into and out of contact with the material, means for rotating the blade when in contact with the material to cut a piece therefrom, and a yieldably mounted plate associated with said blade and rotatable therewith, said plate being in advance of the blade and adapted to press against the material so as to prevent displacement of the uncut bulk of the material beyond the cutting edge of the blade upon the lifting of the blade from the material.

4. A machine for dispensing semi-solid material, comprising a support, a tube slidably mounted therein, a rotatable member carried by the tube, a cutter blade carried by said member, means for reciprocating the tube for moving the cutter blade into and out of engagement with the material, and means acting on the rotatable member when the blade is in contact with the material for cutting a piece therefrom.

5. A machine for dispensing semi-solid material, comprising a substantially horizontally disposed cutter, means for rotating said cutter when in contact with the material for cutting a piece therefrom, means for lifting the cutter with the cut piece thereon to a discharging position, means for rotating the cutter when in such position for effecting the discharge of the piece therefrom, and means for returning the cutter to the position which it left when lifted out of the bulk.

6. A machine for dispensing semi-solid material, comprising a substantially horizontally disposed cutter, means for rotating the cutter when in contact with the material for cutting a piece therefrom, means for lifting the cutter out of the material with the cut piece thereon, and a sweep arm movable over the cutter for discharging the piece therefrom.

7. A machine for dispensing semi-solid material, comprising a substantially horizontally disposed cutter blade, means for rotating the blade when in contact with the material for cutting a piece therefrom, means for lifting the blade out of the material with the cut piece thereon, a sweep movable over the blade for discharging the piece therefrom, and coacting means associated with the sweep and the blade for actuating the sweep.

8. In a machine of the character described, the combination with a rotatably mounted cutter blade, of means for moving the blade into and out of engagement with the material to be cut thereby, including a ratchet wheel, a rod splined therein and serving to rotate the blade, means including a pawl for turning said wheel, and an adjustable guard for determining the number of teeth that the pawl may engage for regulating the actuating movement of the cutter.

9. A machine for dispensing semi-solid material, comprising in combination a cutter, means for moving the cutter into and out of cutting engagement with the material, said means comprising a mechanical movement including a ring gear in the plane of reciprocation of the cutter and an intermeshing pinion means rolling therein and serving to give reciprocable motion to the cutter.

10. A machine for dispensing semi-solid bulk material from a receptacle, comprising a cutter blade, means for moving the blade into engagement with the bulk material in the receptacle, means for turning the blade when engaged with the bulk material for cutting a piece therefrom, means for withdrawing the blade from the receptacle with the cut piece thereon, and means for removing the cut piece from the blade.

11. The combination with a receptacle containing semi-solid bulk material, of a machine for dispensing the material from the receptacle, said machine having cutting means for cutting pieces directly from the bulk material in the receptacle, means for removing the pieces as cut from the cutting means, and means providing a mounting for the machine over the receptacle, said mounting including means whereby the machine may be shifted into and out of operative position over the open upper end of the receptacle.

12. A machine for dispensing semi-solid bulk material from a receptacle, comprising a cutter in the form of a relatively flat blade shaped to conform to a segment of the receptacle and disposed transversely to the axis thereof, means for turning the blade when engaged with the bulk material for cutting a piece therefrom, means for moving the blade into the receptacle to engage the material therein at successive lower levels, means for withdrawing the blade from the receptacle with the cut piece thereon, and means for removing the cut piece from the blade.

13. A machine for dispensing semi-solid bulk material from a receptacle, comprising a cutter in the form of a relatively flat blade shaped to conform to a segment of the receptacle and disposed transversely to the axis thereof, means for moving the blade into engagement with the bulk material in the receptacle, means for turning the blade when engaged with the bulk material for cutting a piece therefrom, said blade being set at a pitch to cut the material in the receptacle along a spiral path axially thereof, means for withdrawing the blade from the receptacle with the cut piece thereon, and means for removing the cut piece from the blade.

14. A machine for dispensing semi-solid bulk material from a receptacle, comprising a cutter blade, means for moving the blade into engagement with the bulk material in the receptacle, means for turning the blade when engaged with the bulk material for cutting a piece therefrom, said blade being in the form of a relatively flat plate shaped to conform to a segment of the receptacle and disposed transversely to the axis thereof with the center of the plate in line with said axis and the body of the plate extending to the inner surface of the receptacle, means for withdrawing the blade from the receptacle with the cut piece thereon, and means for removing the cut piece from the blade.

15. A machine for dispensing semi-solid bulk material from a receptacle, comprising a cutter, means for moving the cutter into engagement with the bulk material in the receptacle, means for actuating the cutter when engaged with the bulk material for cutting a piece therefrom, means for removing the piece from the cutter, said several means being arranged and connected to act automatically in the order named, and means for adjusting the cutting action of the cutter for regulating the size or volume of the piece to be cut by the cutter from the bulk material.

In testimony whereof I affix my signature.
HERMAN A. POPPENHUSEN.